(12) United States Patent
Shumaker

(10) Patent No.: US 10,682,916 B2
(45) Date of Patent: Jun. 16, 2020

(54) THERMAL MANAGEMENT OF ELECTRIC VEHICLE COUPLER CONTACTS

(71) Applicant: AeroVironment, Inc., Monrovia, CA (US)

(72) Inventor: Scott Shumaker, Alta Loma, CA (US)

(73) Assignee: WEBASTO CHARGING SYSTEMS, INC., Simi Valley, CA (US)

( * ) Notice: Subject to any disclaimer, the term of this patent is extended or adjusted under 35 U.S.C. 154(b) by 102 days.

(21) Appl. No.: 15/898,194

(22) Filed: Feb. 15, 2018

(65) Prior Publication Data

US 2018/0229615 A1 Aug. 16, 2018

Related U.S. Application Data

(60) Provisional application No. 62/459,192, filed on Feb. 15, 2017.

(51) Int. Cl.
| | | |
|---|---|---|
| *H01R 13/713* | (2006.01) |
| *B60L 11/18* | (2006.01) |
| *H01R 13/66* | (2006.01) |
| *B60L 53/16* | (2019.01) |
| *B60L 53/60* | (2019.01) |

(52) U.S. Cl.
CPC .......... *B60L 11/1818* (2013.01); *B60L 53/16* (2019.02); *B60L 53/60* (2019.02); *H01R 13/6683* (2013.01); *H01R 13/7137* (2013.01); *H01R 2201/26* (2013.01)

(58) Field of Classification Search
CPC ........................................................ B60L 53/60
USPC ........................................................ 320/109
See application file for complete search history.

(56) References Cited

U.S. PATENT DOCUMENTS

| | | | |
|---|---|---|---|
| 2012/0119702 A1 | 5/2012 | Gaul et al. | |
| 2013/0193918 A1 | 8/2013 | Sarkar et al. | |
| 2014/0266040 A1* | 9/2014 | Hassan-Ali | ........... B60L 3/0069 320/109 |
| 2016/0137079 A1* | 5/2016 | Jefferies | .............. B60L 11/1816 320/109 |

OTHER PUBLICATIONS

International Search Report for Serial No. PCT/US2018/018448 dated Apr. 30, 2018.

* cited by examiner

*Primary Examiner* — Edward Tso
*Assistant Examiner* — Ahmed H Omar
(74) *Attorney, Agent, or Firm* — Brooks Acordia IP Law, PC; Michael Zarrabian

(57) ABSTRACT

In a number of embodiments, an Electric Vehicle Supply Equipment (EVSE) connector (120), includes a plurality of charging lines (150, 151) configured to provide electrical charge to an electric vehicle (EV) (140) at least one control line (153, 154) configured to carry signals to control charging of the EV via the charging lines (150, 151) and a detector (170) that detects a thermal event, wherein in response to detecting a thermal event the detector (170) manipulates the at least one control line (153, 154) to alter charging of the EV via the charging lines (150, 151).

20 Claims, 14 Drawing Sheets

THERMAL MANAGEMENT OF ELECTRIC VEHICLE COUPLER CONTACTS

CROSS-REFERENCE TO RELATED APPLICATIONS

This application claims priority to and the benefit of U.S. Provisional Patent Application No. 62/459,192, filed Feb. 15, 2017, the contents of which are hereby incorporated by reference herein for all purposes.

TECHNICAL FIELD

Embodiments relate generally to systems, methods, and devices for safe charging, and more particularly to thermal monitoring and electric vehicle coupler circuit management.

BACKGROUND

Electric Vehicle Supply Equipment (EVSE) is designed to operate in a manner that is simple, safe, ergonomic and cost-efficient. It is designed to provide safe alternating current (AC) power for on-board chargers of Electric Vehicles (EVs) or plug-in hybrid electric vehicles (PHEVs). In many instances, the EVSE comprises a charging connector that couples with an inlet on an EV or PHEV to create a circuit that can charge the vehicle. These coupling contacts are generally rated for a large number of use cycles during their lifetimes.

SUMMARY

In many embodiments, an Electric Vehicle Supply Equipment (EVSE) connector, including a plurality of charging lines is configured to provide electrical charge to an electric vehicle (EV) at least one control line configured to carry signals to control charging of the EV via the charging lines and a detector that detects a thermal event, in response to detecting a thermal event the detector manipulates the at least one control line to alter charging of the EV via the charging lines.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

Figure 1:
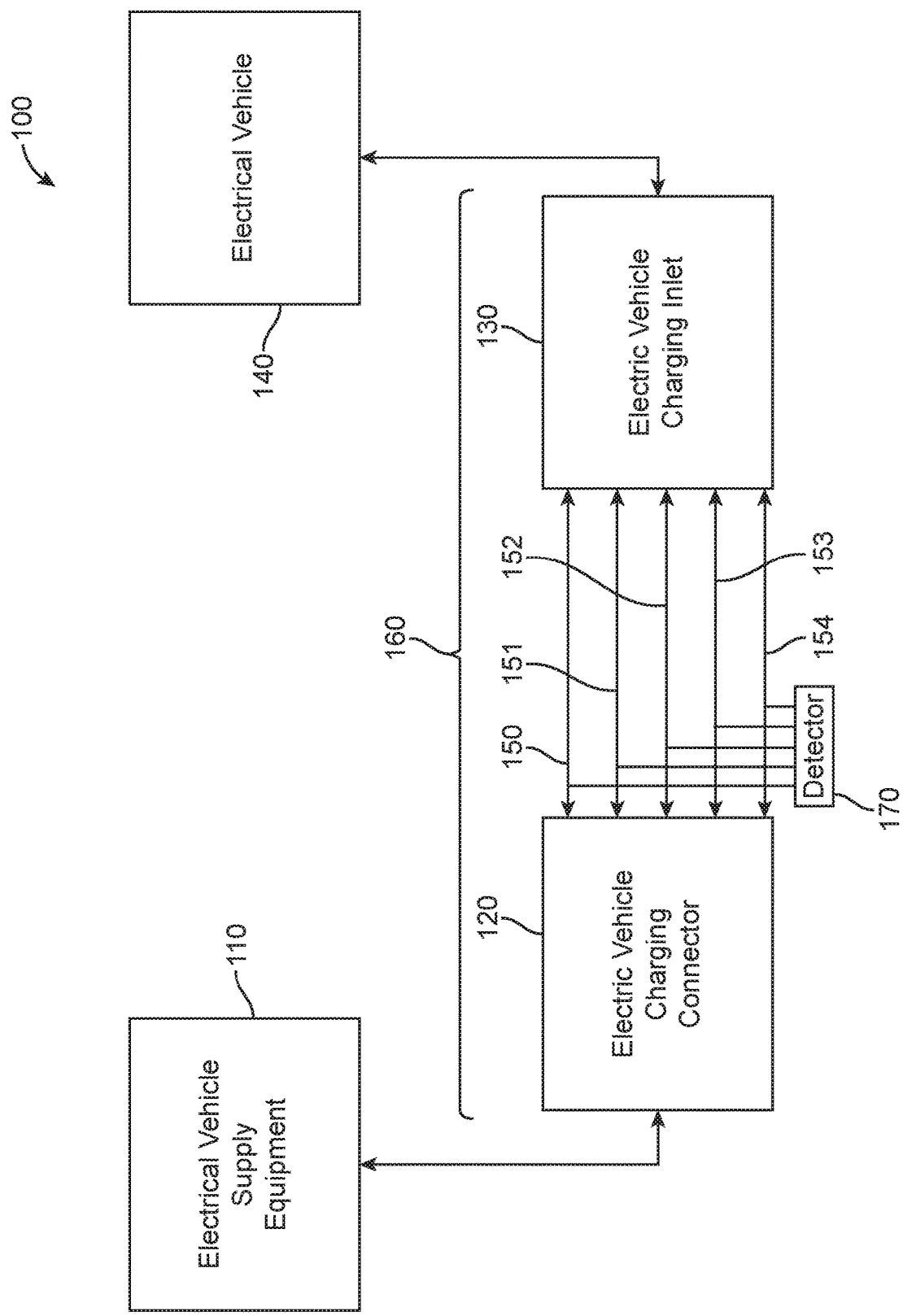
FIG. 1 depicts a charging system in accordance with an embodiment of the invention.

Turning now to methods, systems, and embodiments for thermal management of electric vehicle coupler contacts, having the ability to sense a high resistance connection, that may be causing unnecessary heat in the coupler, is a differentiating feature from the EV couplers and EVSE products available on the market today. The problem with traditional temperature sensing methods is that some logic is required to determine when to react to an over temperature event. In the EVSE application this means that sensing wires need to be carried from the EV coupler back to the control board of the EVSE. This drives up system complexity and cost. The present solution provides the fault response of a coupler contact temperature event that is contained entirely within the EV coupler itself, without requiring additional connection lines to the EV or additional wiring back to the EVSE.

In many areas of the world, the types of couplers and connectors used and the temperature ranges they should be operated within are governed by standards bodies. By way of example, and not limitation, an EVSE coupler in the United States may utilize a SAE-J1772 type connector. SAE-J1772 connectors are described in the Society of Automotive Engineers (SAE) Electric Vehicle and Plug in Hybrid Electric Vehicle Conductive Charge Coupler document from SAE International, issued January of 1996, and revised in February of 2016, which is part of the Surface Vehicle Standard and is incorporated by reference in its entirety. Likewise, coupler connector standards for Europe can be found in IEC document 62196-1, edition 3.0 revised June of 2014, entitled "Plugs, socket-outlets, vehicle connectors and vehicle inlets—Conductive charging of electric vehicles" which is also incorporated by reference in its entirety. Finally, EVSE connector standards for The People's Republic of China can be located in both document number GB/T20234.1, entitled "Connection Set for Conductive Charging of Electric Vehicles—Part 1: General Requirements", published in 2015, and document number GB/T 20234.2, also published in 2015 and entitled, "Connection Set for Conductive Charging of Electric Vehicles—Part 2: AC Charging Coupler", both of which are incorporated by reference in their entireties. As such, while certain embodiments of the invention are illustrated and described as utilizing the SAE-J1772 standards, it should be apparent to those skilled in the art that any of the embodiments described in this application can be applied to any coupling standard, including those described above.

In embodiments of the present invention small thermal sensors are implemented in the coupler connector of an EVSE and operate as a thermal cutout. In certain embodiments, the thermal sensors may have a bimetal snap-element with contacts that either open or close an electrical circuit by a pre-set response temperature. Finally, in many embodiments, the reset temperature can also be pre-set and automatically switches after a considerable drop in temperature. In a number of embodiments, the normal operating temperature during charging operations can be between about −30° and 50° C.

In another embodiment, the thermal event includes detecting a first pre-determined temperature above normal operating conditions of the connector.

In a still further embodiment, the detector manipulates the control pilot line.

In a still another embodiment, the manipulation of the control pilot line includes breaking the control pilot line signal, thereby ceasing the EV charging process.

In a yet further embodiment, the detector manipulates the control pilot line only in response to detecting a thermal event.

In yet another embodiment, the absence of the thermal event includes the detector detecting a second pre-determined temperature within the normal operating conditions of the connector.

In a further embodiment again, in response to detecting a thermal event, the detector electrically connects the control pilot line and at least one charging line, to ground to cease charging the EV.

In another embodiment again, the manipulation of the control pilot line by the detector allows for the EVSE to determine if a thermal fault has occurred.

In a further additional embodiment, the connector is also configured to allow for the EVSE to determine if a thermal fault has occurred by reversing the polarity of the charging signal.

In another additional embodiment, the detector manipulates the control pilot line only in response to detecting a thermal event.

In still yet further embodiment, the absence of the thermal event includes the detector detecting a second pre-determined temperature within the normal operating conditions of the connector.

In a still yet additional embodiment, an Electric Vehicle Supply Equipment (EVSE) connector includes a plurality of charging lines configured to provide electrical charge to an electric vehicle (EV), at least one control line configured to carry signals to control charging of the EV via the charging lines, and a detector that detects a thermal event, in response to detecting a thermal event the detector manipulates the at least one control line to alter charging of the EV via the charging lines, the thermal event including detecting a first pre-determined temperature.

In a yet further embodiment again, the detector manipulates the proximity line.

In yet another embodiment again, the manipulation of the proximity line is accomplished by breaking the proximity line signal, thereby ceasing the EV charging process.

In a yet further additional embodiment, the detector manipulates the proximity line only in response to detecting a thermal event.

In a further additional embodiment again, the absence of the thermal event includes the detector detecting a second pre-determined temperature within the normal operating conditions of the connector.

In a still yet additional embodiment, in response to detecting a thermal event, the detector electrically connects the control pilot line and at least one charging line, to ground to cease charging the EV.

In still yet further embodiment again, the manipulation of the proximity line by the detector allows for the EVSE to determine if a thermal fault has occurred.

In yet another further embodiment, the connector is also configured to allow for the EVSE to determine if a thermal fault has occurred by reversing the polarity of the charging signal.

In another further embodiment again, the detector manipulates the proximity line only in response to detecting a thermal event.

FIG. 1 depicts a system 100 for charging an electric vehicle in accordance with an embodiment of the invention. In numerous embodiments, an electric vehicle supply equipment (EVSE) device 110 can provide an electric vehicle charging connector 120 to connect to an electric vehicle charging inlet 130. This connection between the electric vehicle charging connector 120 and the electric vehicle charging inlet 130 creates a coupling connection 160. In a variety of embodiments, this coupling connection 160 comprises multiple different connection lines 150, 151, 152, 153, 154. These connection lines 150, 151, 152, 153, 154 can be existing connection lines according to the aforementioned standards, including, but not limited to, the SAE-J1772 connector. In other embodiments, the connection lines 150, 151, 152, 153, 154 can comply with other aforementioned standards. In more embodiments, the connection lines comprise electrical conduction paths. In still more embodiments, the connection lines can comprise materials including, but not limited to, copper or any other suitable electrical conductor. In a number of embodiments, lines 150 and 151 may be utilized to provide AC or DC power to the electric vehicle 140 at voltages between about 120 and 240 and at currents between approximately 12 to 80 Amperes, and can be considered charging connection lines. In further additional embodiments, the power carried by the charging connection lines is sufficient to charge the EV. In many embodiments, line 152 can be an equipment or chassis ground line connection. In additional embodiments, line 153 may be a control pilot line that provides control signals to the electric vehicle 140 from the EVSE device 110. In further embodiments, the line 154 can be a proximity line that may provide the electric vehicle 140 and/or the EVSE device 110 a method of determining if a coupling connection 160 is present. In this way, in further additional embodiments, the control pilot line 153, and proximity line 154 may be considered control connection lines. When a coupling connection is present, the electric vehicle 140 may begin to receive an electric charge necessary to charge the electric vehicle's 140 internal batteries. In still additional embodiments, thermal detectors 170 may be placed on or in at least one of the control connection lines 153, 154. In certain additional embodiments, the thermal detectors 170 may also have a thermal connection to at least one of the charging connection lines 150, 151. In still more embodiments, the thermal detectors 170 can manipulate and/or change the state of at least one of the control lines 153, 154 in response to a thermal event. In more further embodiments, the manipulation and/or change to the state of the at least one control lines 153, 154 can alter the charging process of the EV from the charging connection lines 150, 151. In yet more embodiments, the thermal detectors 170 can detect the thermal event via their connection to one of the charging connection lines 150, 151. In yet still more embodiments, the thermal detectors 170 may respond to a thermal event by entering a thermal fault mode which can interrupt the charging operation of the connector 120. In still additional embodiments, the thermal detectors 170 can restore the charging operation of the connector 120 in the absence of a thermal event by exiting a thermal fault state.

While a variety of electric vehicle charging systems are described above with reference to FIG. 1, the specific configurations and wirings between the parts within an electric vehicle charging system are largely dependent upon the requirements of specific applications. For example, in certain embodiments, the charging system may comprise multiple electrical vehicles 140 or coupling connections 160 with fewer or an increased number of connection lines. An example of an EVSE charging connector that can be utilized for thermal management is discussed below.

Figure 2B:
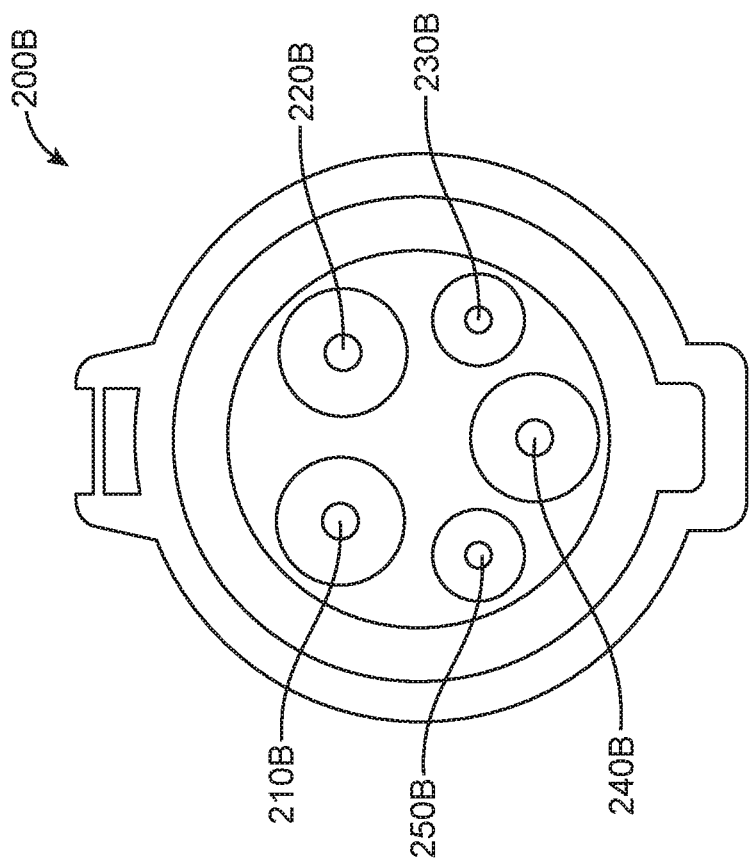
FIG. 2B depicts an illustration of the pinout of an EVSE connector.
Figure 2A:
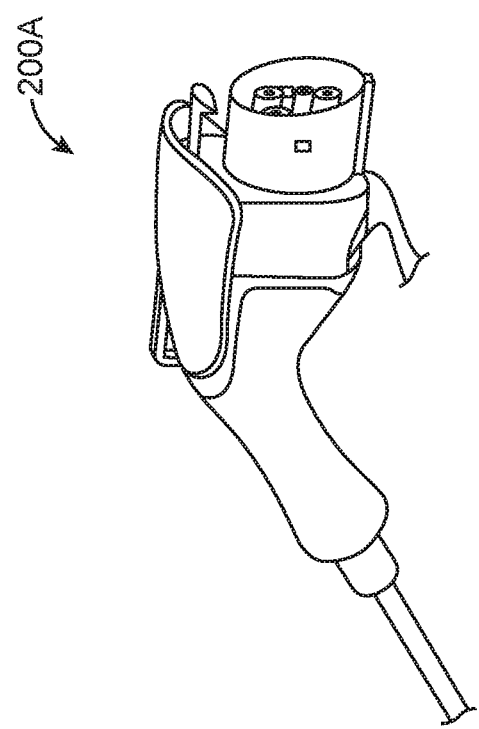
FIG. 2A depicts an a perspective view of an Electric Vehicle Supply Equipment (EVSE) connector.

FIG. 2A depicts an embodiment of an EVSE connector 200A that may be utilized in many embodiments of the invention. The connector 200A complies with the SAE-J1772 connector standards.

FIG. 2B depicts a sample interface 200B of an EVSE connector that complies with the SAE-J1772 standard, in accordance with numerous embodiments of the invention. In certain embodiments, the interface 200B includes numerous connection pins that create the coupling connection between the EVSE connector and the electric vehicle inlet. In further embodiments, the connector pins may include a first power line pin 210B, a second power line pin 220B, a control pilot pin 230B, a grounding pin 240B, and a proximity detection pin 250B.

While a variety of EVSE connectors are described above with reference to FIGS. 2A and 2B, the specific configurations and wirings of an EVSE connector are largely dependent upon the requirements of specific applications. For example, in certain embodiments, the charging system may comprise additional pins for DC power supply or contain the same pins, but in a different arrangement. An example of an EVSE charging connector that can manage thermal events is discussed below.

Figure 3:
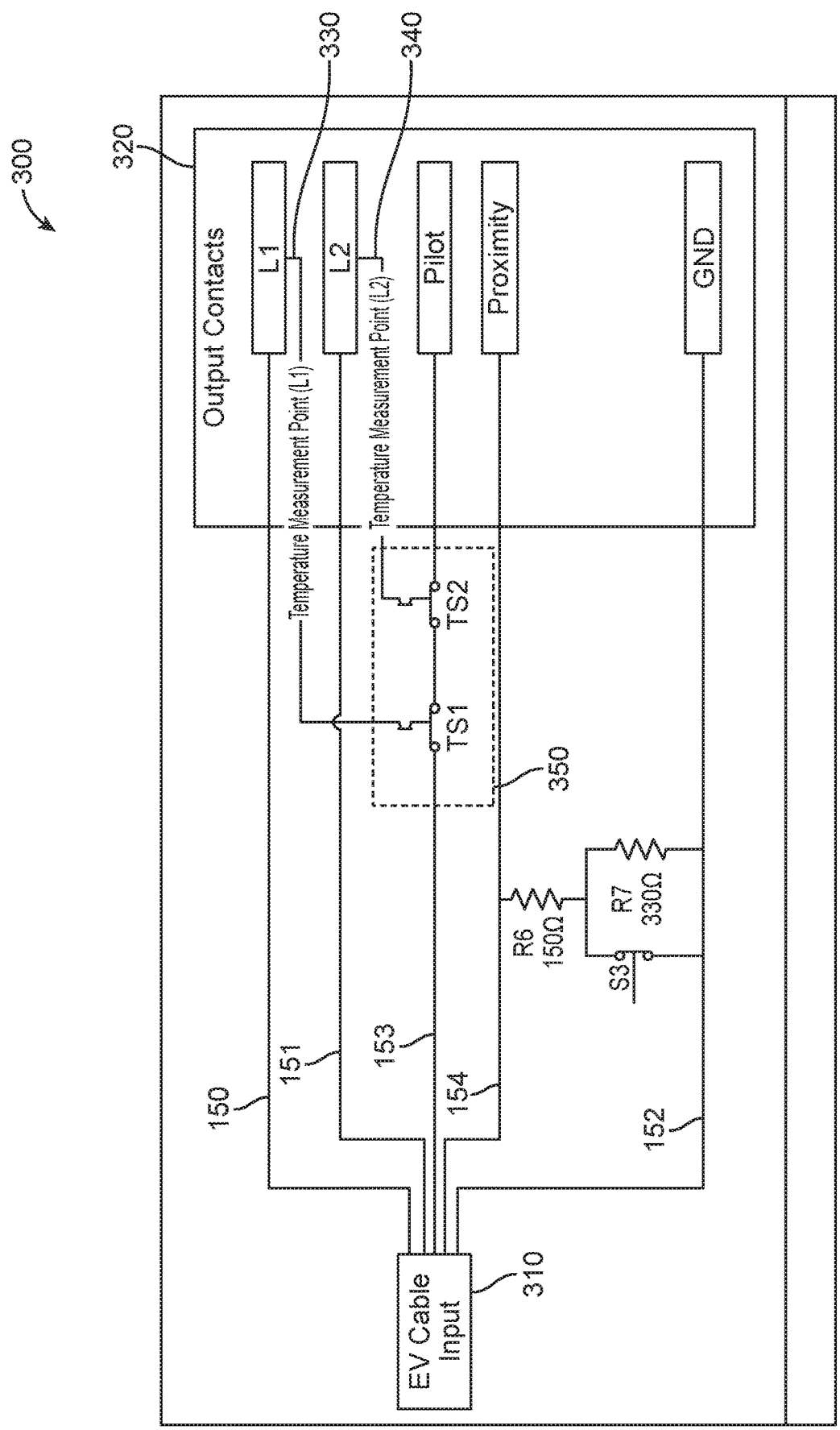
FIG. 3 depicts a circuit for detecting a thermal event on a pilot line in an EVSE connector in accordance with an embodiment of the invention.

FIG. 3 depicts an EVSE connector 300 that comprises circuitry that may allow for passive management of thermal events in accordance with an embodiment of the invention. In many embodiments, the connector 300 can have an EV cable input 310 from the EVSE device. The connector 300 may also provide for a number of output contacts 320 which may include, but are not limited to a first line for electric transmission 150 (L1), a second line for electric transmission 151 (L2), a control pilot line 153 (Pilot), a proximity line 154, and a ground line 152 (GND). In still more embodiments, the control pilot line 153 can be a control connection line that can be used to ensure proper operation when connecting an EV to an EVSE. In yet more embodiments, proper operation may be accomplished through the transmission of a control signal over the control pilot line 153 between the EVSE and EV controllers. The control pilot line signal may be represented as a PWM signal, a series of voltage ranges, or designation states that the EVSE and EV charging controllers can utilize to enter and exit various charging states. In a variety of embodiments, the connector 300 comprises a first temperature measurement line 330 and a second temperature measurement line 340. In additional embodiments, the first 330 and second 340 temperature measurement lines are connected to the first and second electric transmission lines 150, 151 respectively. In further embodiments, the first 330 and second 340 temperature measurement lines connect into thermal detectors 350 that may allow for thermal management. In still further embodiments, the first 330 and second 340 temperature measurement lines are connected to thermal detectors 350 in series and comprise a set of switches that are normally closed during normal operating temperatures. In further additional embodiments, the thermal detectors 350 detect temperature changes at the contacts of the connector 320. In still additional embodiments, the thermal detectors 350 may detect temperature changes in the connector housing. In a variety of embodiments, engagement of the thermal detectors 350 will result in the loss of a PWM signal from the control pilot line 153, which can change the state designation of the controllers in the EV, indicating that the connector 300 may not be properly connected, and to therefore stop the charging process.

In still additional embodiments, the thermal detectors 350 allow for regular use until the temperature of the thermal detectors 350 detect a first pre-determined temperature point, at which time the thermal detectors 350 become engaged, breaking the circuit and ceasing the flow of electricity through the connector 300 and to the electric vehicle. In still yet further embodiments, the thermal detectors 350 may disengage once a second pre-determined temperature has been reached, such as when the thermal event has ended and the connector returns to normal operating temperatures. In still yet additional embodiments, the thermal detectors 350 may comprise at least one bi-metallic strip that opens when the first pre-determined temperature has been detected and closes again once the second pre-determined temperature has been reached. By way of example and not limitation, thermal detectors 350 may detect first pre-determined point and open the circuit when the sensor temperature reaches about 100° C. and reaches the second pre-determined point and closes the circuit at approximately 80° C.

Figure 4:
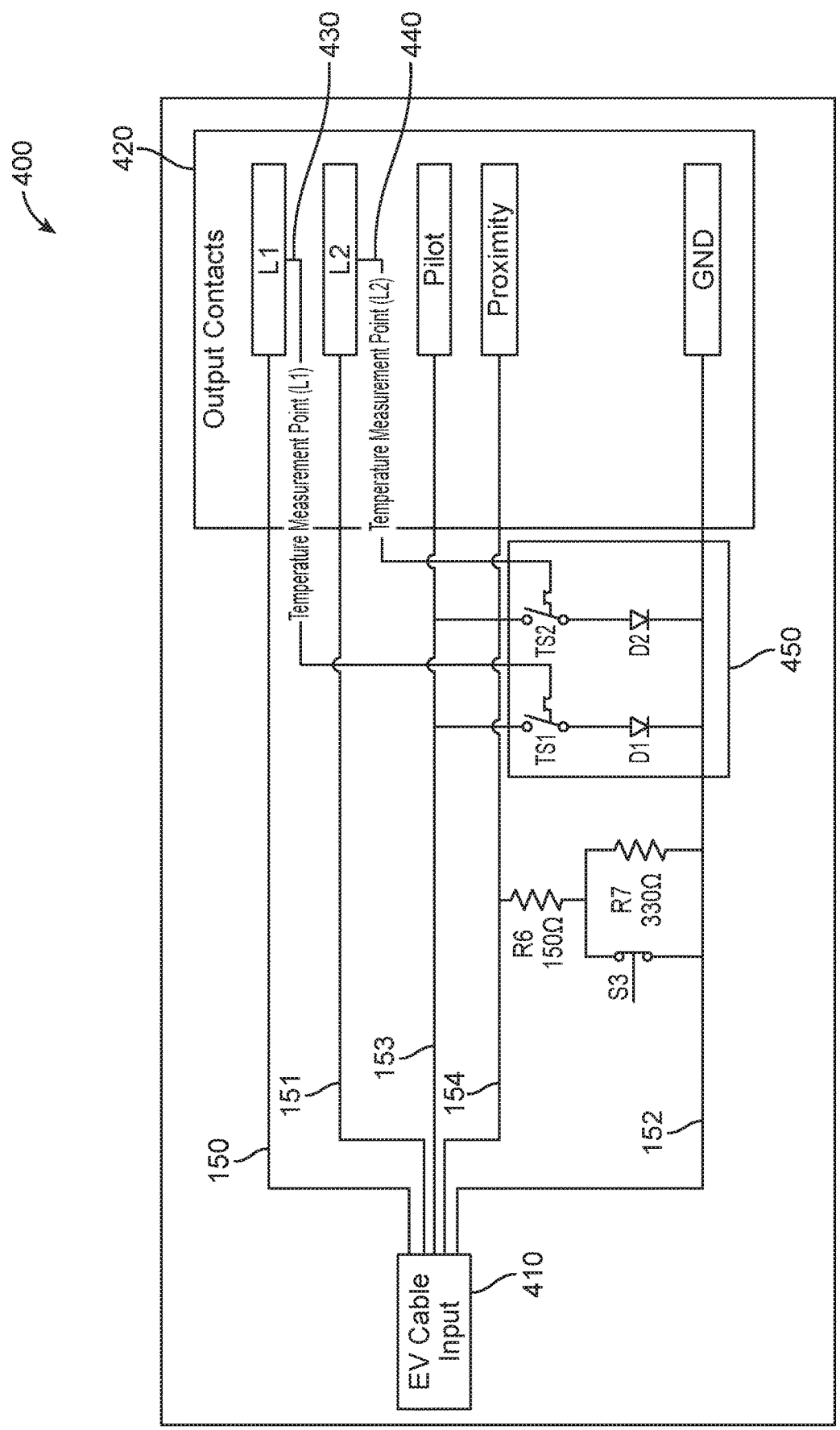
FIG. 4 depicts a circuit for detecting a thermal event on a pilot line in an EVSE connector in accordance with an embodiment of the invention.

FIG. 4 depicts an EVSE connector 400 that comprises circuitry that may allow for passive management of thermal events in accordance with an embodiment of the invention. In many embodiments, the connector 400 can have an EV cable input 410 from the EVSE device. The connector 400 may also provide for a number of output contacts 420 which may include, but are not limited to a first line for electric transmission 150 (L1), a second line for electric transmission 151 (L2), a control pilot line 153 (Pilot), a proximity line 154, and a ground line 152 (GND). In a variety of embodiments, the connector 400 comprises a first temperature measurement line 430 and a second temperature measurement line 440. In additional embodiments, the first 430 and second 440 temperature measurement lines are connected to the first and second electric transmission lines respectively. In further embodiments, the first 430 and second 440 temperature measurement lines connect into thermal detectors 450 that may allow for thermal management. In still further embodiments, the first 430 and second 440 temperature measurement lines are connected such that when one switch is closed, the pilot line 153 can be shorted to ground. In certain embodiments, ground can be ground voltage or zero volts. In certain additional embodiments, instead of connecting to zero volts, the charging and/or control connection lines can be connected to another voltage level. In still yet further embodiments, the EVSE may detect this grounding, throw a fault and try to change the polarity of the voltage. In still more embodiments, the thermal detectors 450 may include diodes that can allow for a voltage possible in one direction, but not the other when the thermal detectors 450. In yet more embodiments, the EVSE may determine that a thermal fault has occurred by determining that a voltage is present in one direction, but not in the other. In additional further embodiments, the EVSE may display fault information on a screen indicating a thermal fault. In some additional embodiments, the EVSE can transmit a notification of the thermal fault to another device, such as, but not limited to, a user's mobile computing device or diagnostic machine. In further additional embodiments, the thermal detectors 450 detect temperature changes at the contacts of the connector 420. In still additional embodiments, the thermal detectors 450 may detect temperature changes in the connector housing. In a variety of embodiments, engagement of the thermal detectors 450 will result in the loss of a PWM signal from the control pilot line 153, which can change the state designation of the controllers in the EV, indicating that the connector 400 may not be properly connected, and to therefore stop the charging process.

In still additional embodiments, the thermal detectors 450 allow for regular use until the temperature of the thermal detectors 450 detects a first pre-determined temperature point, at which time the thermal detectors 450 become engaged, breaking the circuit and ceasing the flow of electricity through the connector 400 and to the electric vehicle. In still yet further embodiments, the thermal detectors 450 may disengage once a second pre-determined temperature has been reached, such as when the thermal event has ended and the connector returns to normal operating temperatures. In still yet additional embodiments, the thermal detectors 450 may comprise at least one bi-metallic strip that opens when the first pre-determined temperature has been detected and closes again once the second pre-determined temperature has been reached. By way of example and not limitation, thermal detectors 450 may detects a first pre-determined point and open the circuit when the sensor temperature reaches about 100° C. and reaches the second pre-determined point and closes the circuit at approximately 80° C.

Figure 5:
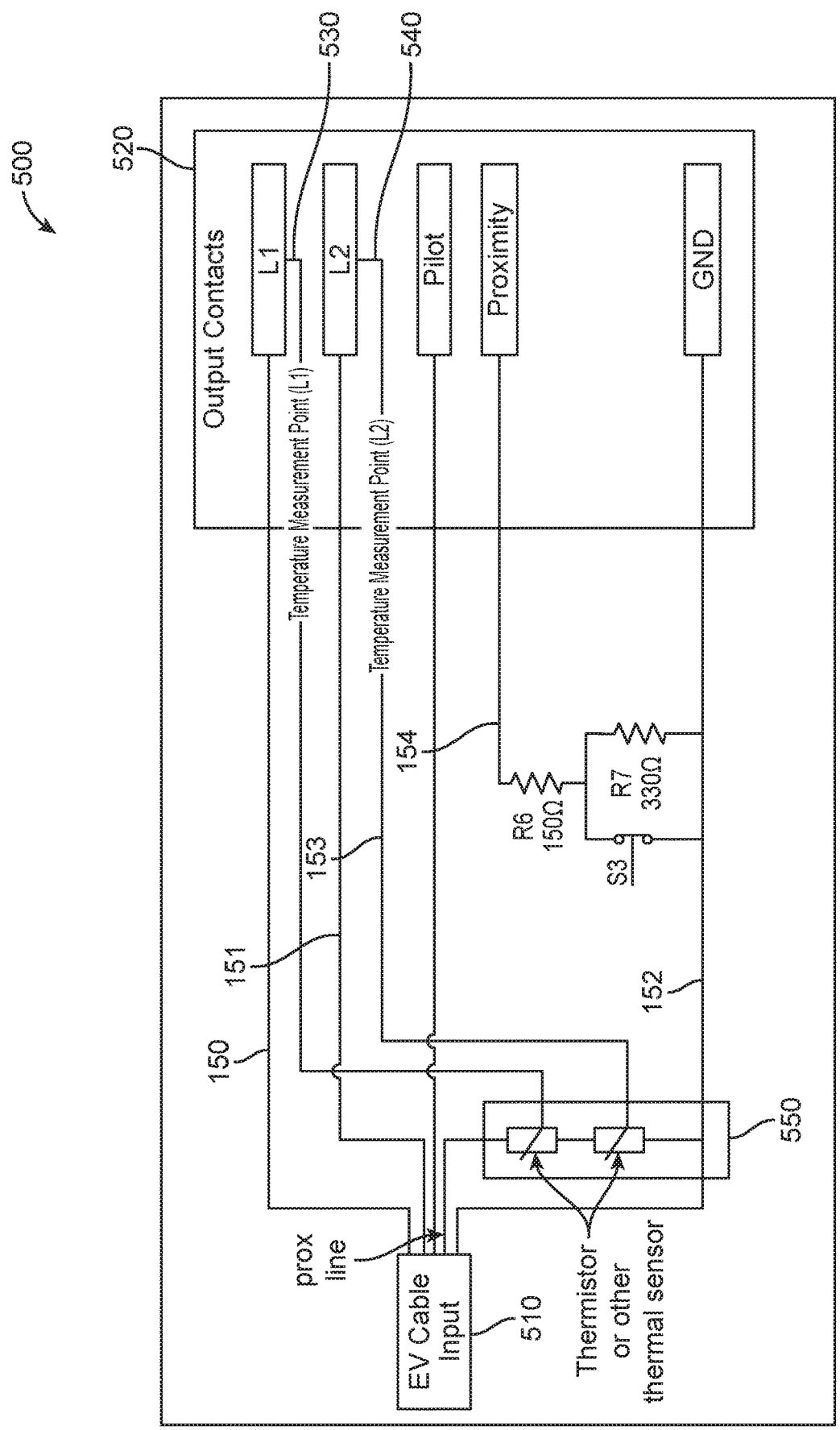
FIG. 5 depicts a circuit for detecting a thermal event on a proximity line in an EVSE connector in accordance with an embodiment of the invention.

FIG. 5 depicts an EVSE connector 500 that comprises circuitry that may allow for passive management of thermal events in accordance with an embodiment of the invention. In many embodiments, the connector 500 can have an EV cable input 510 from the EVSE device. The connector 500 may also provide for a number of output contacts 520 which may include, but are not limited to a first line for electric transmission 150 (L1), a second line for electric transmission 151 (L2), a control pilot line 153 (Pilot), a proximity line 154, and a ground line 152 (GND). In a variety of embodiments, the connector 500 comprises a first temperature measurement line 530 and a second temperature measurement line 540. In additional embodiments, the first 530 and second 540 temperature measurement lines are connected to the first and second electric transmission lines respectively. In further embodiments, the first 530 and second 540 temperature measurement lines connect into thermal detectors 550 that may allow for thermal management. In still further embodiments, the first 530 and second 540 temperature measurement lines are connected in series and comprise a set of switches that are normally closed during normal operating temperatures. In a variety of embodiments, an open switch will result in the interruption of the proximity line 154. In further additional embodiments, the thermal detectors 550 detect temperature changes at the contacts of the connector 520. In still additional embodiments, the thermal detectors 550 may detect temperature changes in the connector housing. In a variety of embodiments, engagement of the thermal detectors 550 will result in a drop of voltage in the proximity line 154 to approximately 0 volts, which can indicate to the controllers in the EV and EVSE that the connector 500 may not be properly connected, and to therefore throw a fault and to stop the charging process.

In still additional embodiments, the thermal detectors 550 allow for regular use until the temperature of the thermal detectors 550 detects a first pre-determined temperature point, at which time the thermal detectors 550 become engaged, breaking the circuit and ceasing the flow of electricity through the connector 500 and to the electric vehicle. In still yet further embodiments, the thermal detectors 550 may disengage once a second pre-determined temperature has been reached, such as when the thermal event has ended and the connector returns to normal operating temperatures. In still yet additional embodiments, the thermal detectors 550 may comprise at least one bi-metallic strip that opens when the first pre-determined temperature has been detected and closes again once the second pre-determined temperature has been reached. By way of example and not limitation, thermal detectors 550 may detects a first pre-determined point and open the circuit when the sensor temperature reaches about 100° C. and reaches the second pre-determined point and closes the circuit at approximately 80° C.

Figure 6:
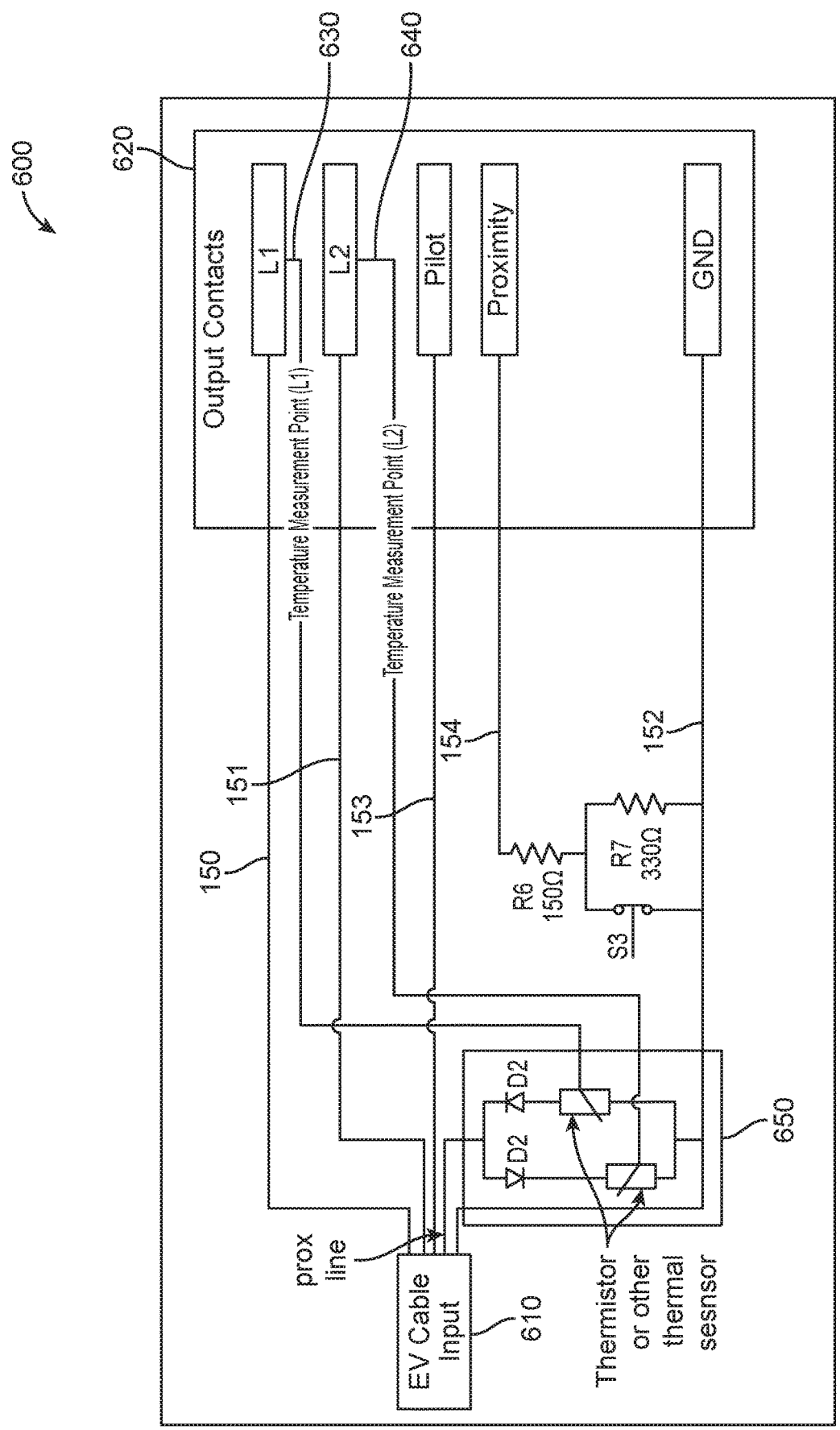
FIG. 6 depicts a circuit for detecting a thermal event on a proximity line in an EVSE connector in accordance with an embodiment of the invention.

FIG. 6 depicts an EVSE connector 600 that comprises circuitry that may allow for passive management of thermal events in accordance with an embodiment of the invention. In many embodiments, the connector 600 can have an EV cable input 610 from the EVSE device. The connector 600 may also provide for a number of output contacts 620 which may include, but are not limited to a first line for electric transmission 150 (L1), a second line for electric transmission 151 (L2), a control pilot line 153 (Pilot), a proximity line 154, and a ground line 152 (GND). In certain embodiments, ground can be ground voltage or zero volts. In certain additional embodiments, instead of connecting to zero volts, the charging and/or control connection lines can be connected to another voltage level. In a variety of embodiments, the connector 600 comprises a first temperature measurement line 630 and a second temperature measurement line 640. In additional embodiments, the first 630 and second 640 temperature measurement lines are connected to the first and second electric transmission lines respectively. In further embodiments, the first 630 and second 640 temperature measurement lines connect into thermal detectors 650 that may allow for thermal management. In still further embodiments, the first 630 and second 640 temperature measurement lines are connected such that when one switch is closed, the proximity line 154 may be shorted to ground. In still yet further embodiments, the EVSE may detect this grounding, throw a fault and try to change the polarity of the voltage. In still more embodiments, the thermal detectors 650 may include diodes that can allow for a voltage possible in one direction, but not the other when the thermal detectors 650. In yet more embodiments, the EVSE may determine that a thermal fault has occurred by determining that a voltage is present in one direction, but not in the other. In further additional embodiments, the thermal detectors 650 detect temperature changes at the contacts of the connector 620. In still additional embodiments, the thermal detectors 650 may detect temperature changes in the connector housing. In a variety of embodiments, engagement of the thermal detectors 650 will result in a drop of voltage in the proximity line 154 to approximately 0 volts, which can indicate to the controllers in the EV and EVSE that the connector 600 may not be properly connected, and to therefore throw a fault and to stop the charging process.

In still additional embodiments, the thermal detectors 650 allow for regular use until the temperature of the thermal detectors 650 detects a first pre-determined temperature point, at which time the thermal detectors 650 become engaged, breaking the circuit and ceasing the flow of electricity through the connector 600 and to the electric vehicle. In still yet further embodiments, the thermal detectors 650 may disengage once a second pre-determined temperature has been reached, such as when the thermal event has ended and the connector returns to normal operating temperatures. In still yet additional embodiments, the thermal detectors 650 may comprise at least one bi-metallic strip that opens when the first pre-determined temperature has been detected and closes again once the second pre-determined temperature has been reached. By way of example and not limitation, thermal detectors 650 may detects a first pre-determined point and open the circuit when the sensor temperature reaches about 100° C. and reaches the second pre-determined point and closes the circuit at approximately 80° C.

While a variety of EVSE connectors and thermal safety connection arrangements are described above with reference to FIGS. 3-6, the specific configurations and wirings of thermal safety connectors are largely dependent upon the requirements of specific applications. For example, it can be appreciated by those skilled in the art that the first and second pre-determined temperature points can be picked from a wide array of values, and can be utilized best when the first pre-determined point is generally at any temperature above normal operating temperature and the second pre-determined point is any temperature generally at or below the highest normal operating temperature. Additionally, in a number of embodiments, these concepts may be reversed to manage thermal events that are below the ideal operating temperatures of the system. A discussion of a reduction to practice of a thermally managed EVSE connector is below.

Figure 7:
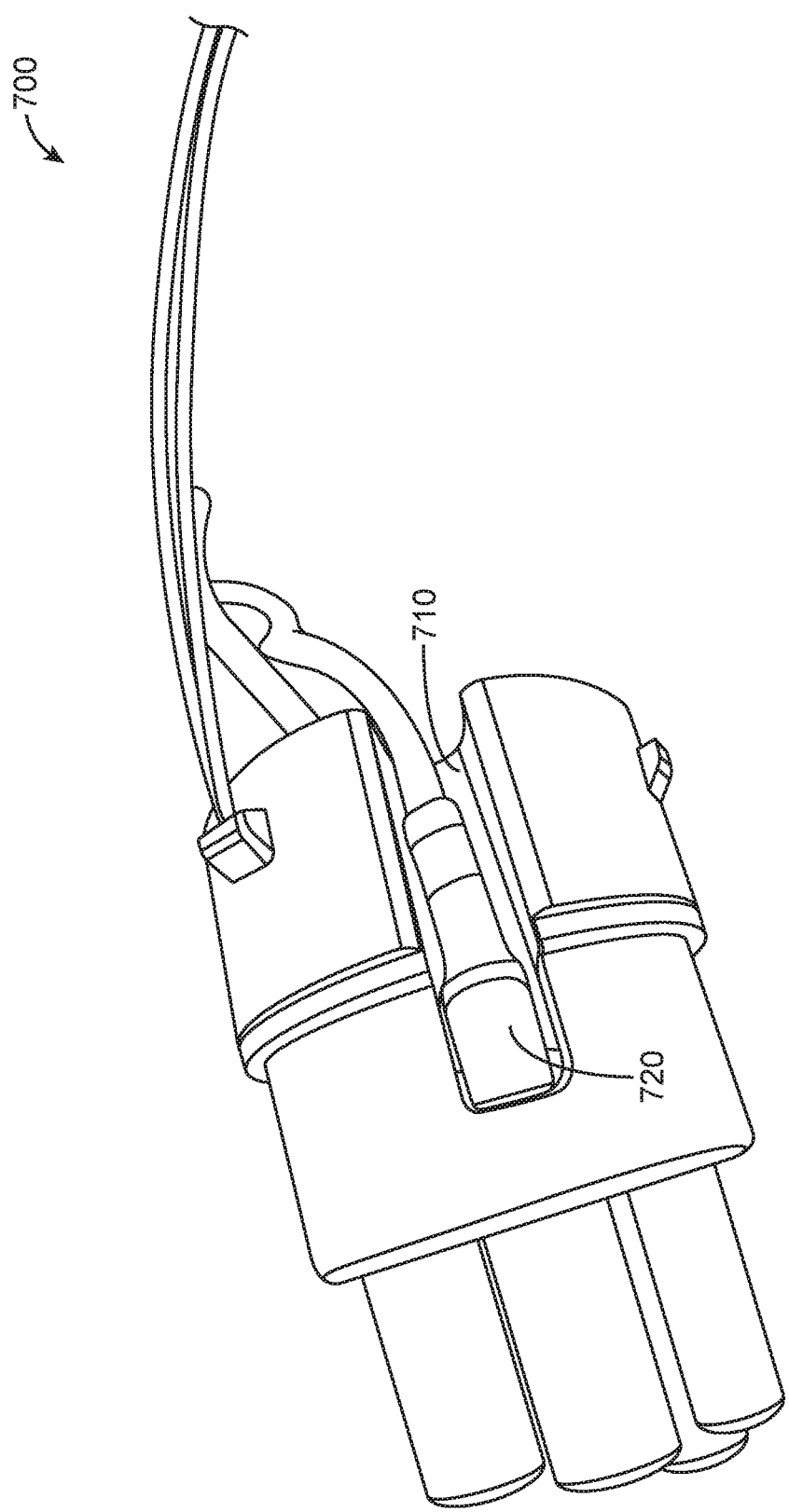
FIG. 7 depicts a modified connector capable of receiving a thermal sensor in accordance with an embodiment of the invention.

FIG. 7 depicts a modified EVSE connector capable of receiving a thermal sensor in accordance with an embodiment of the invention. In many embodiments, the connector 700 may have a section of plastic removed 710 to allow for the placement of a thermal sensor on a power pin 720. In a number of embodiments, the thermal sensors may be integrated into the plastic assembly. In additional embodiments, the thermal sensors may be mounted on the power pin 720 such that the removed plastic 710 may be replaced or not removed. In still additional embodiments, thermal sensors may be utilized that require less space than indicated by the removed plastic 710.

Figure 8:
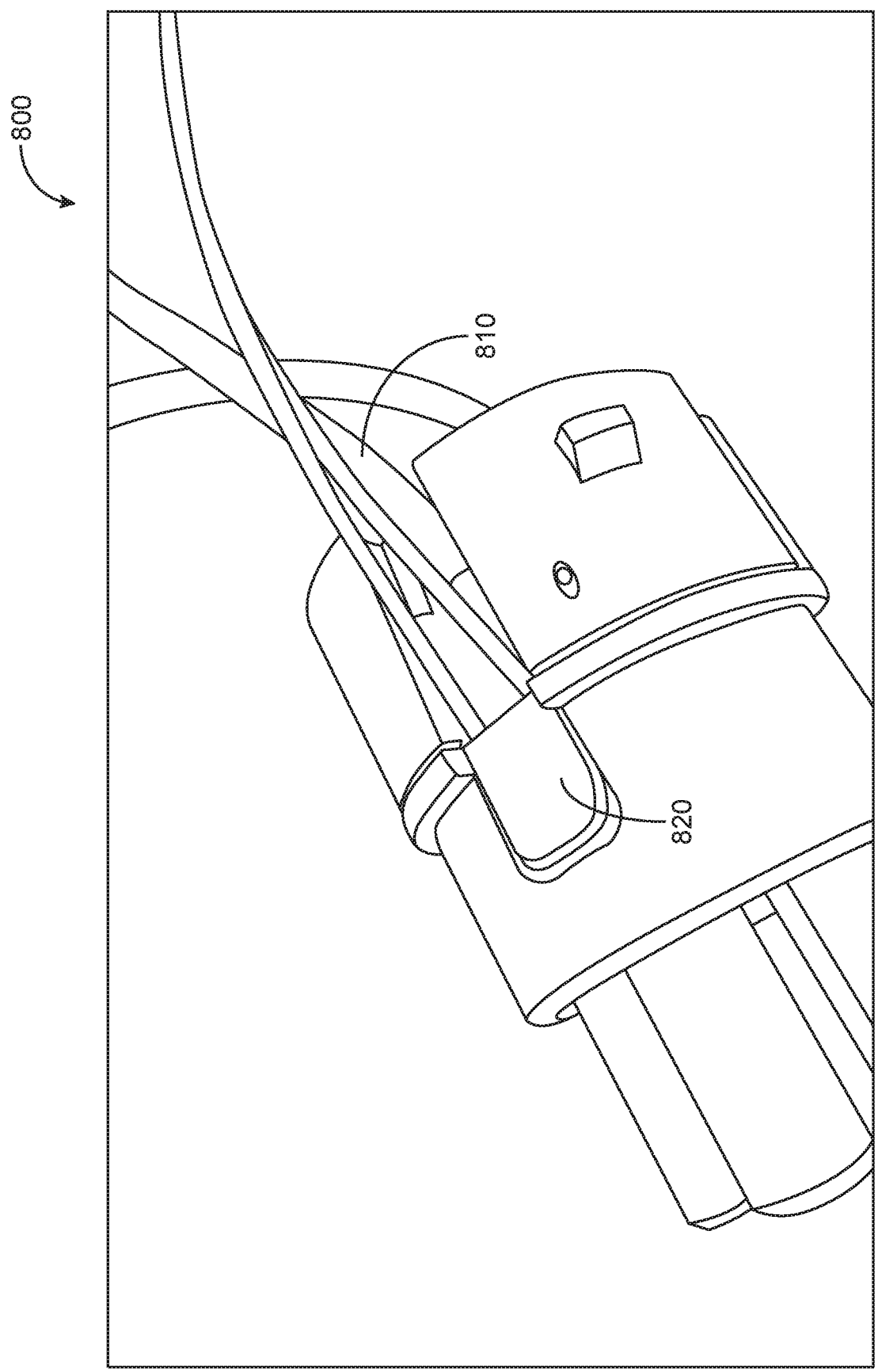
FIG. 8 depicts a modified connector with a thermal sensor in accordance with an embodiment of the invention.

FIG. 8 depicts an EVSE connector modified to include a thermal sensor in accordance with an embodiment of the invention. In various embodiments, the connector 800 may have a thermal sensor 820 installed on top of a power pin 810. In further embodiments, the thermal sensor 820 can sit flush with the body of the connector 800. In still further embodiments, the thermal sensor 820 may be internal of the connector 800 which may not have any plastic removed to make room for the thermal sensor 820.

Figure 9:
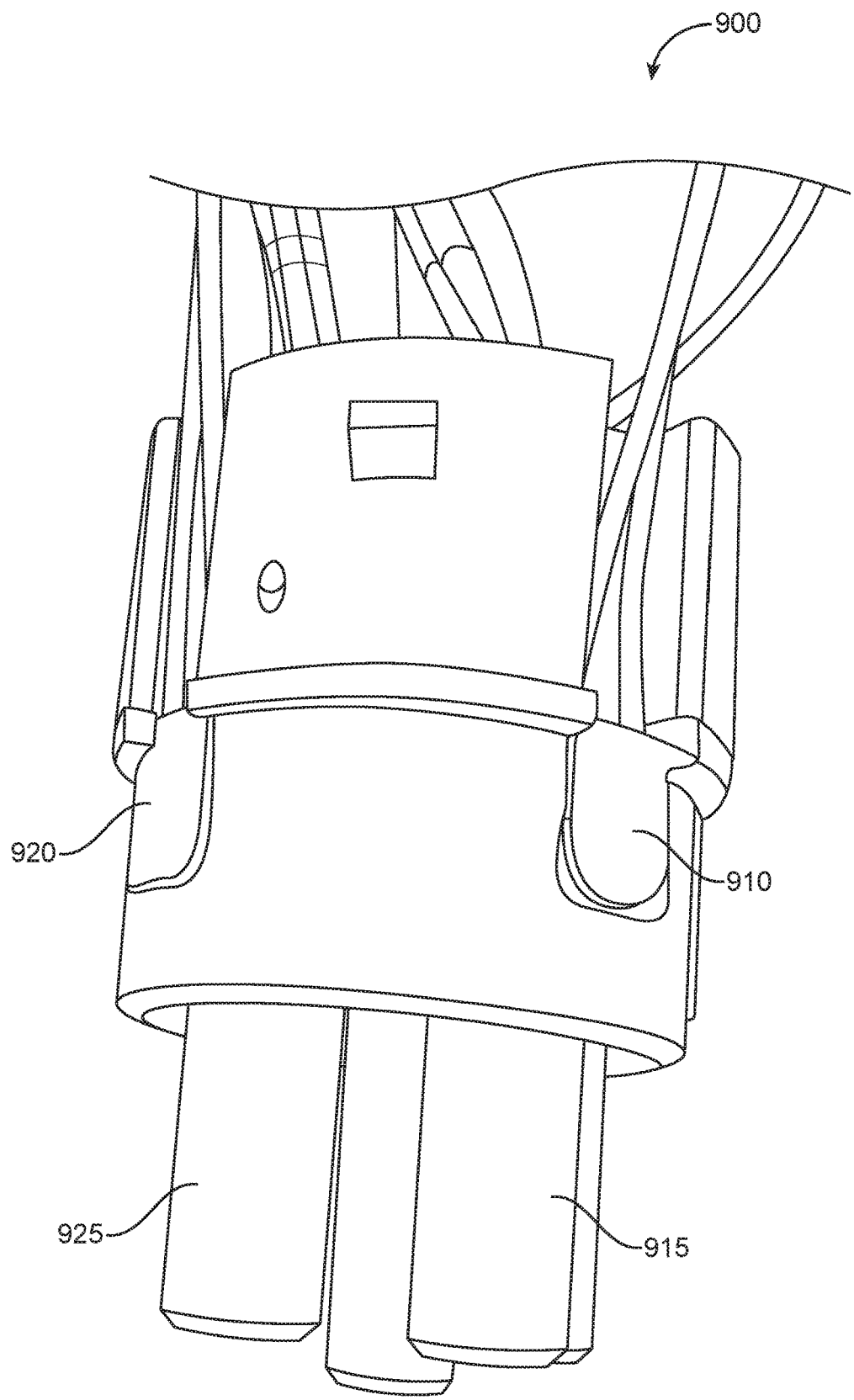
FIG. 9 depicts a modified connector with two thermal sensors in accordance with an embodiment of the invention.

FIG. 9 depicts an EVSE connector modified to include two thermal safety sensors in accordance with an embodiment of the invention. In a variety of embodiments, the connector 900 can have thermal sensors 910, 920 attached to power lines 915 and 925. In additional embodiments, the power lines 915 and 925 are the L1 and L2 lines in an EVSE connector. In certain additional embodiments, the thermal sensors 910 and 920 may be placed in position before the connector 900 can be reassembled for testing and/or use.

Figure 10:
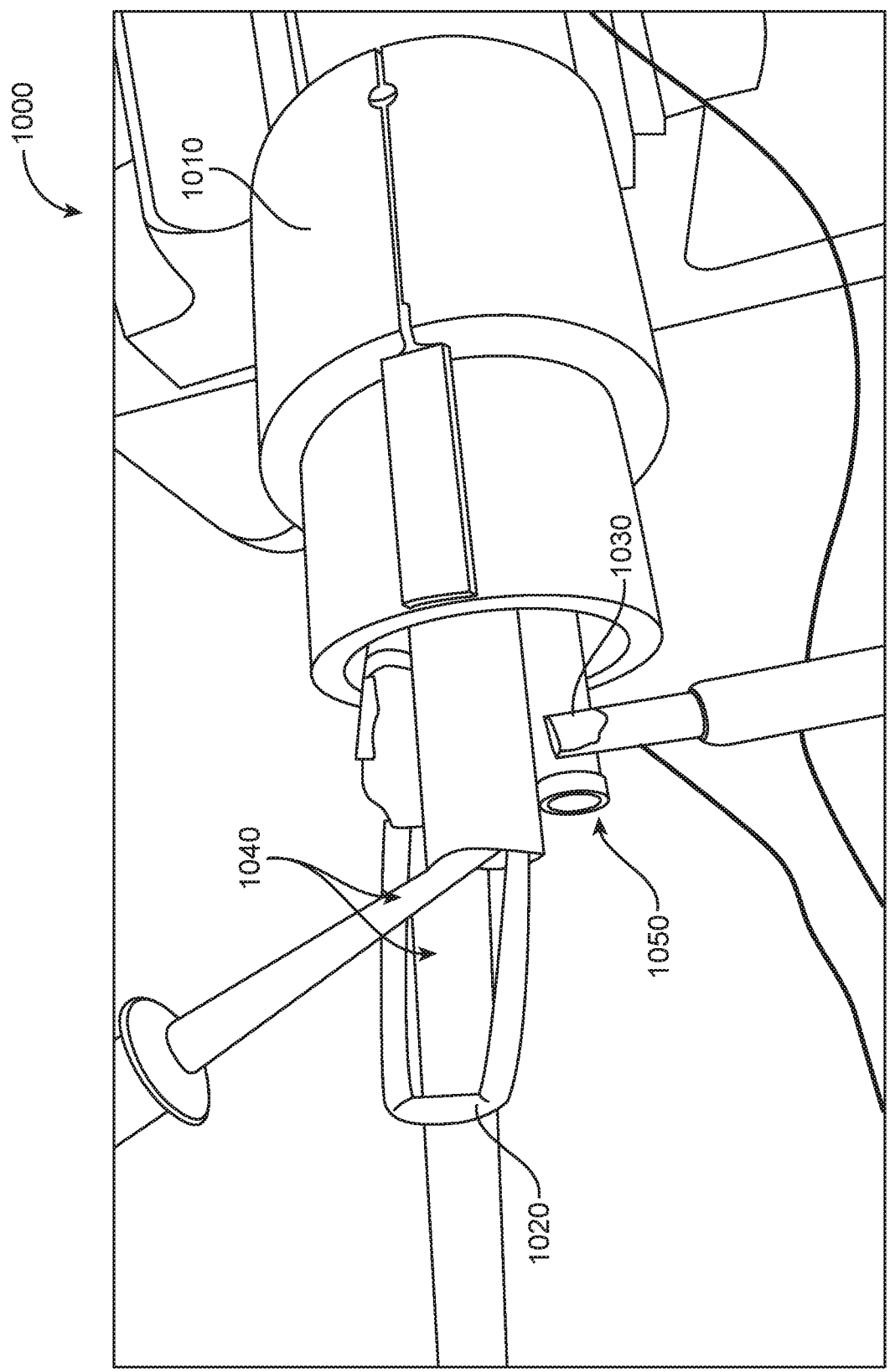
FIG. 10 depicts a testing arrangement for testing a modified connector with a thermal sensor in accordance with an embodiment of the invention.

FIG. 10 depicts a testing arrangement to verify that thermal detectors are working in accordance with an embodiment of the invention. In many embodiments, the testing arrangement 1000 comprises an EVSE connector 1010 that has an enabling wire 1020 that provides for the flow of a charge flow. In additional embodiments, testing probes can be inserted at different points in or on the pin connections to measure the voltage. In further embodiments, a mating pin 1050 may be inserted into the connector 1010 such that a heating source, such as, but not limited to, a soldering iron can be applied to artificially increase the temperature to a first pre-determined temperature point to engage the thermal detectors. In further embodiments, to allow for testing, an enabling wire 1020 can be placed between a charging connection line and the ground. In this way, connector 1010 charging behaviors may occur absent connection to a vehicle inlet, allowing for easier placement of testing equipment. In many further embodiments, the enabling wire 1020 comprises a resistor of about 880. Ohms and a diode. In certain further embodiments, a set of testing probes 1040 can be utilized to measure the voltage at various points of the connector 1010, including, but not limited to, a charging connection line and a ground line. In even further embodiments, a mating pin 1050 can have an external heat source 1030 applied that may increase the temperature of the thermal sensor, providing for a controlled entrance into a default thermal state. Likewise, in a number of embodiments, the removal of the external heat source 1030 from the mating pin 1050 can reduce the temperature of the connector 1010, allowing for an exit from the default thermal state.

Figure 11:
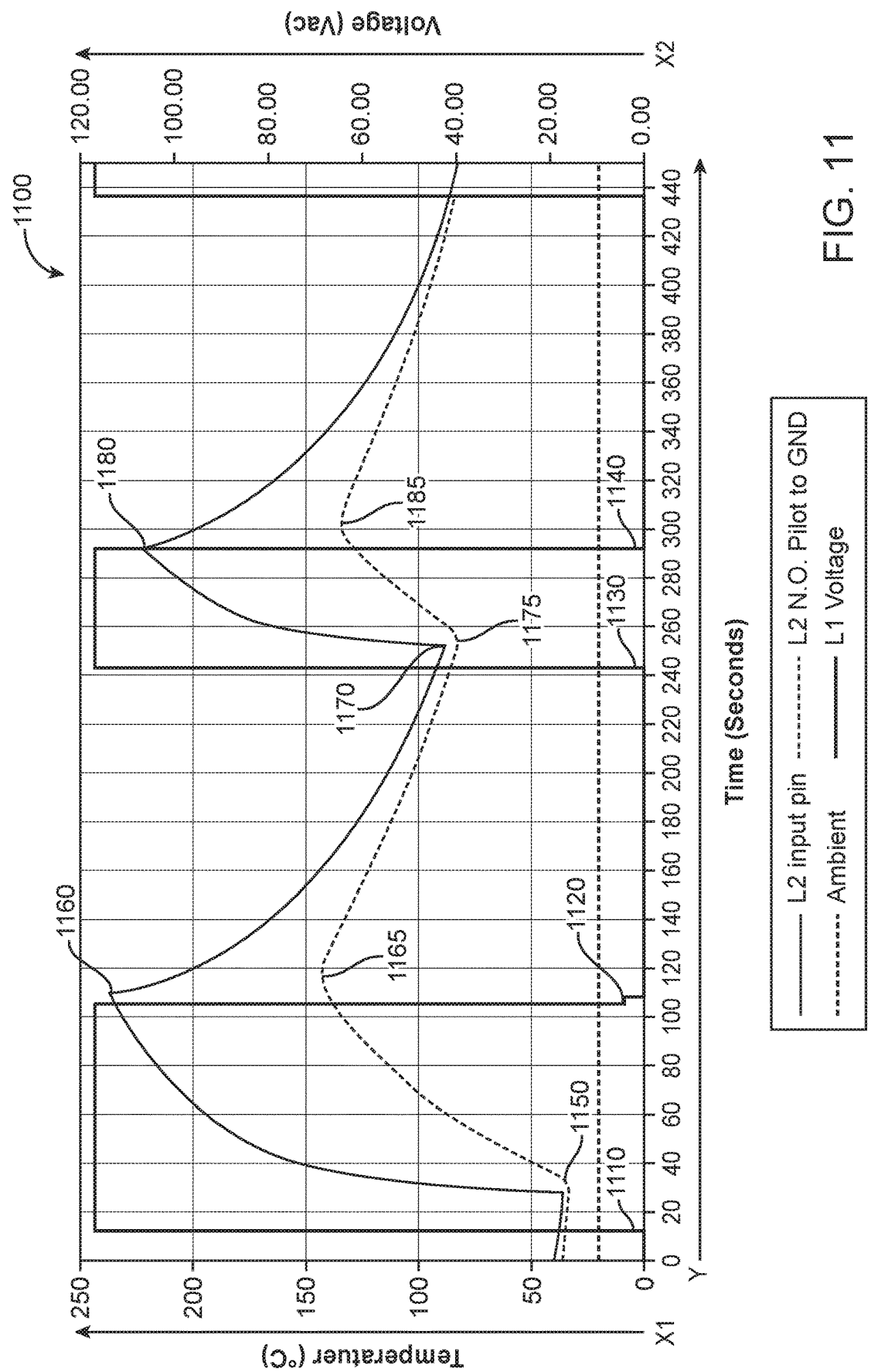
FIG. 11 depicts a graph of the results of the testing arrangement of the modified connector in accordance with an embodiment of the invention.

FIG. 11 depicts a chart of results from an EVSE with thermal safety connection subjected to a testing arrangement in accordance with an embodiment of the invention. In many embodiments, the testing system may include a switching temperature of about 100 degrees C. and have a reset temperature of approximately 70 degrees C. The chart 1100 is a graph depicting a set of results from a thermal sensing test. The chart is a time graph over both temperature and voltage. The vertical X1 axis represents temperature in degrees centigrade (° C.), the vertical X2 axis is the voltage in AC, and the horizontal Y axis is the time measured in seconds. The thin solid line (L2 input pin), the thin dashed line (L2 Non-operational (N.O.) Pilot to GND and thick dashed line (Ambient temperature) is graphed out as a measured temperature over time. The thick solid line (L1 Voltage) is graphed out as measured AC voltage over time. At time 1110, L1 voltage increases to approximately 118 volts AC. At point 1150, an external thermal source is applied to the connector, which increases the L2 input pin and L2 N.O. Pilot to GND line increases in temperature. It can be seen that the external thermal source is limited to the internal components of the connector as the ambient temperature stays constant throughout. The temperature of the L2 input pin increased from approximately 40 degrees C. to about 240 degrees C. At approximately 105 seconds, the temperature of the connector increased beyond the switching temperature and creates a thermal fault state, which caused the L1 Voltage line drops to 0 volts at 1120. The external thermal source is then removed, and the temperature of the L2 input pin 1160 and L2 N.O. Pilot to GND line 1165 begin to decrease in temperature. At approximately 242 seconds, the temperature of the connector drops below the reset temperature, exits the thermal fault state, and the L1 Voltage 1130 increases from 0 volts to approximately 118 volts. The external thermal source is then again applied to the connector, and the temperature of the L2 input pin 1170 increases as well as the L2 N.O. Pilot to GND 1175. Again, at approximately 290 seconds, the switching temperature is reached, entering a thermal fault state and the L1 Voltage drops to zero volts 1140. The external thermal source is removed which is indicated by the drop in the L2 input pin temperature 1180 as well as the L2 N.O. Pilot to GND temperature 1185. In a number of embodiments, the cycle of thermal fault-caused voltage drops and thermal fault exit resets in response to thermal changes can occur as many times as needed until component failure occurs.

Figure 12:
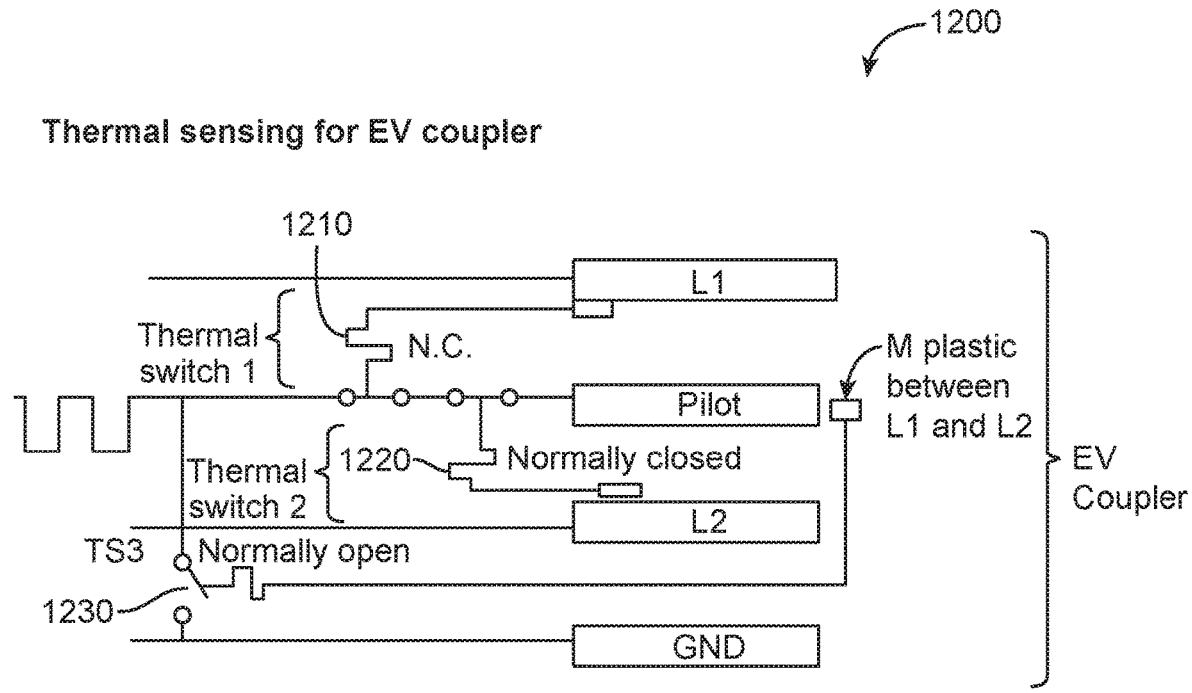
FIG. 12 depicts a schematic diagram for thermal sensing in an EV coupler in accordance with an embodiment of the invention.

FIG. 12 depicts a schematic diagram for thermal sensing in an EV coupler in accordance with an embodiment of the invention. In many embodiments, the thermal sensing circuit 1200 can include three thermal sensors including a first normally closed sensor 1210, a second normally closed sensor 1220, and a third normally open sensor 1230. In a number of embodiments, the first thermal sensor 1210 can be positioned between L1 and the control pilot line. In additional embodiments, the second thermal sensor 1220 can be situated between the L2 and control pilot lines. In further additional embodiments, the first and second thermal sensor 1210, 1220 may form a thermal detector. In still additional embodiments, the third normally open thermal sensor 1230 can be placed between the control pilot line and ground. In a variety of embodiments, the third thermal sensor 1230 can close and short the control pilot signal, ceasing the charging process. In certain other embodiments, either of the first or second thermal switches 1210, 1220 can open to break the control pilot signal from either the L1 or L2 lines, also ceasing the charging process.

Figure 13:
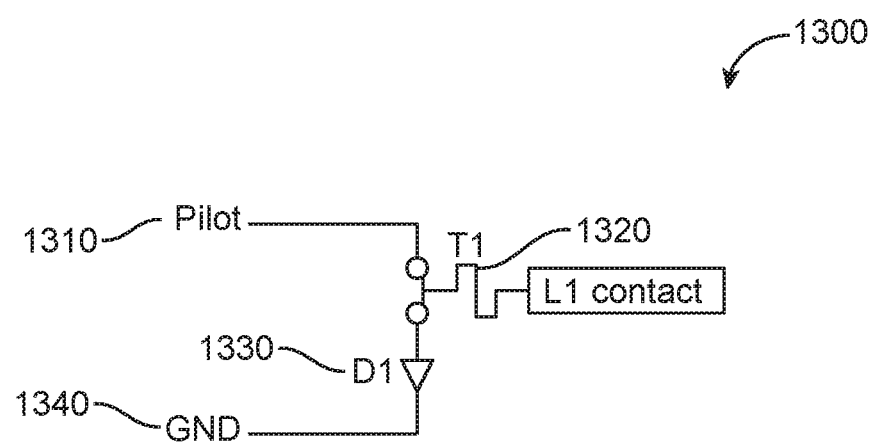
FIG. 13 depicts a thermal sensor embodiment with a diode in accordance with an embodiment of the invention.

FIG. 13 depicts a thermal sensor circuit embodiment with diode in accordance with an embodiment of the invention. In numerous embodiments, the thermal sensor circuit 1300 comprises a control pilot signal 1310, a thermal sensor 1320 that connects to the L1 contact line and can be completed with a ground connection 1340, with a diode 1330 between the thermal sensor 1320 and the ground 1340. In a variety of embodiments, the diode will conduct when the thermal switch 1320 closes and the pilot remains at +6 volts. In more embodiments, the EVSE can measure zero volts on the control pilot line, indicating a temperature or a control pilot line fault. In still more embodiments, if the EVSE processor changes the pilot voltage to about −12 volts, then the diode becomes reversed biased and the EVSE processor will be able to measure about −12 volts, differentiating a pilot fault from a temperature fault.

Figure 14:
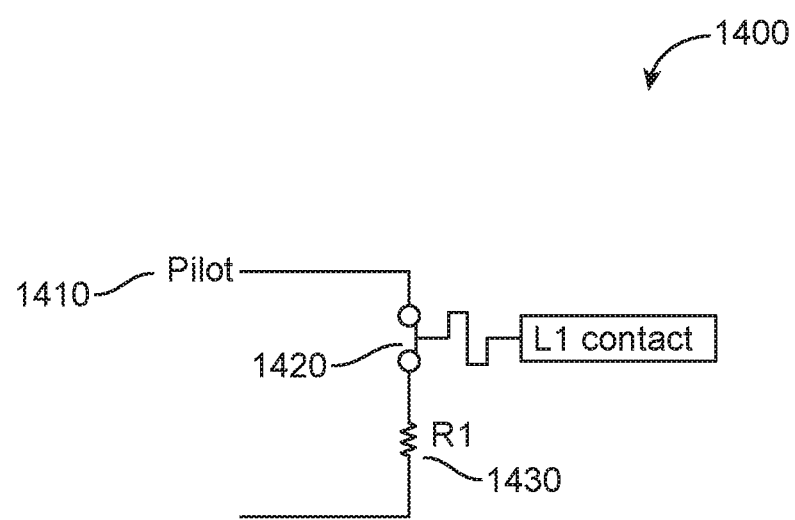
FIG. 14 depicts a thermal sensor in accordance with an embodiment of the invention.

FIG. 14 depicts a thermal sensor circuit in accordance with an embodiment of the invention. In many embodiments, the thermal sensor circuit 1400 comprises a control pilot line 1410, a thermal sensor 1420 connected to the L1 line contact. The circuit 1400 continues past the thermal sensor 1420 to a resistor 1430. In further embodiments, a voltage can be measured by the resistor 1430.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention is herein disclosed by way of examples and should not be limited by the particular disclosed embodiments described above.

What is claimed is:

1. An Electric Vehicle Supply Equipment (EVSE) connector, comprising:
   a plurality of charging lines configured to provide electrical charge to an electric vehicle (EV);
   at least one control line configured to carry a control pilot line signal to control charging of the EV via the charging lines; and
   a passive detector connected to the at least one control line, wherein the passive detector detects a first thermal event, wherein the first thermal event comprises detecting a first pre-determined temperature above normal operating conditions of the connector, and wherein in response to detecting the first thermal event the passive detector passively breaks the control pilot line signal, wherein breaking the control pilot line signal stops charging of the EV via the charging lines.

2. The EVSE connector of claim 1, wherein the detector passively manipulates the control pilot line by breaking the control pilot line signal, thereby ceasing charging of the EV.

3. The EVSE connector of claim 2, wherein the detector passively manipulates the control pilot line by reestablishing the control pilot line signal upon detecting a second pre-determined temperature within the normal operating conditions of the connector, thereby restarting charging of the EV.

4. The EVSE connector of claim 1, wherein in response to detecting the first thermal event, the detector passively manipulates the control pilot line and at least one charging line, to cease charging the EV.

5. The EVSE connector of claim 4, wherein the passive manipulation of the control pilot line by the detector comprises electrically connecting the control pilot line and at least one charging line to ground.

6. The EVSE connector of claim 5, further configured to allow for the EVSE to determine if a thermal fault has occurred by reversing the polarity of the charging signal.

7. The EVSE connector of claim 5, wherein the detector passively manipulates the control pilot line and at least one charging line by electrically disconnecting the control pilot line and at least one charging line from ground upon detecting a second pre-determined temperature within the normal operating conditions of the connector thereby restarting charging of the EV.

8. An Electric Vehicle Supply Equipment (EVSE) connector, comprising:
   a plurality of charging lines configured to provide electrical charge to an electric vehicle (EV);
   at least one control line configured to carry a control pilot line signal to control charging of the EV via the charging lines;
   a passive detector connected to at the least one control line, wherein the passive detector detects a first thermal event, wherein in response to detecting the first thermal event the detector passively breaks the control pilot line signal, wherein breaking the control pilot line signal stops charging of the EV via the charging lines, the first thermal event comprising detecting a first pre-determined temperature above normal operating conditions of the connector; and
   a diode connected between the passive detector and ground, wherein the diode distinguishes between a control line fault and the detected first thermal event.

9. The EVSE connector of claim 8, wherein the detector manipulates a proximity line by passively breaking the proximity line signal, thereby ceasing the charging of the EV.

10. The EVSE connector of claim 9, wherein the detector passively manipulates the proximity line by reestablishing the proximity line signal upon detecting a second pre-determined temperature within the normal operating conditions of the connector, thereby restarting charging of the EV.

11. The EVSE connector of claim 10, wherein in response to detecting the first thermal event, the detector passively manipulates a proximity line and at least one charging line, to cease charging the EV.

12. The EVSE connector of claim 11, wherein the passive manipulation of the proximity line by the detector comprises electrically connecting the proximity line and at least one charging line to ground.

13. The EVSE connector of claim 12, further configured to allow for the EVSE to determine if a thermal fault has occurred by reversing the polarity of the charging signal.

14. The EVSE connector of claim 1, wherein the detector comprises a pair of passive thermal sensors connected in series on the pilot line, wherein the control pilot line signal is broken by a first passive thermal sensor of the pair of passive thermal sensors if the first thermal event is detected at a first charging line of the plurality of charging lines by a first temperature measurement line connected between the first passive thermal sensor and the first temperature measurement line.

15. The EVSE connector of claim 14, wherein the pair of passive thermal sensors are connected to a first temperature measurement line and second temperature measurement line and wherein the first temperature measurement line is connected to a first charging line and the second temperature line is connected to a second charging line.

16. The EVSE connector of claim 5, wherein the detector comprises a pair of passive thermal sensors and a pair of diodes.

17. The EVSE connector of claim 14, wherein the control pilot line signal is broken by a second passive thermal sensor of the pair of passive thermal sensors if the first thermal event is detected at a second charging line of the plurality of charging lines by a second temperature measurement line connected between the second passive thermal sensor and the second temperature measurement line.

18. The EVSE connector of claim 17, wherein the pair of passive thermal sensors are connected to a first temperature measurement line and second temperature measurement line and wherein the first temperature measurement line is connected to a first charging line and the second temperature line is connected to a second charging line.

19. The EVSE connector of claim 12, wherein the detector passively manipulates the control proximity line and at least one charging line by electrically disconnecting the proximity line and at least one charging line from ground upon detecting a second pre-determined temperature within the normal operating conditions of the connector thereby restarting charging of the EV.

20. The EVSE connector of claim 8, wherein the diode allows for voltage in a first direction and not a second direction, and wherein the EVSE the first thermal event is detected based on a voltage present in the first direction and not in the second direction.

* * * * *